United States Patent
Schulte

(10) Patent No.: US 6,237,780 B1
(45) Date of Patent: May 29, 2001

(54) VIBRATORY SEPARATOR SCREENS

(75) Inventor: David L. Schulte, Broussard, LA (US)

(73) Assignee: Tuboscope I/P, Inc., Houston, TX (US)

( * ) Notice: Subject to any disclaimer, the term of this patent is extended or adjusted under 35 U.S.C. 154(b) by 0 days.

(21) Appl. No.: 09/432,959

(22) Filed: Nov. 3, 1999

(51) Int. Cl.[7] .......................... B01D 39/08; B01D 39/10; B01D 33/00; B07D 1/46
(52) U.S. Cl. .......................... 210/388; 210/489; 210/492; 210/499; 209/401
(58) Field of Search .................................. 210/388, 389, 210/499, 489, 492; 209/401

(56) References Cited

U.S. PATENT DOCUMENTS

| | | |
|---|---|---|
| 163,448 | 5/1875 | Bracher . |
| 1,304,918 * | 5/1919 | Sweetland . |
| 1,459,845 * | 6/1923 | Mitchell . |
| 1,747,631 | 2/1930 | Helman . |
| 1,814,598 | 7/1931 | Herrmann . |
| 1,830,792 * | 11/1931 | Herrmann . |
| 1,879,377 | 9/1932 | McNeely . |
| 1,915,931 * | 6/1933 | Herrmann . |
| 1,997,713 | 4/1935 | Boehm . |
| 2,082,513 | 6/1937 | Roberts . |
| 2,723,032 | 11/1955 | Gisler et al. . |
| 2,926,785 * | 6/1960 | Sander . |
| 2,929,464 | 3/1960 | Sprouse . |
| 3,012,674 * | 12/1961 | Hoppe . |
| 3,789,498 | 2/1974 | Cole . |
| 4,380,494 | 4/1983 | Wilson . |
| 4,491,517 | 1/1985 | Janovac . |
| 4,691,744 | 9/1987 | Haver et al. . |
| 4,696,751 | 9/1987 | Eifling . |
| 5,137,622 | 8/1992 | Souter . |
| 5,256,291 | 10/1993 | Cagle . |
| 5,256,292 | 10/1993 | Cagle . |
| 5,370,797 | 12/1994 | Cagle . |
| 5,626,234 | 5/1997 | Cook et al. . |
| 5,653,346 | 8/1997 | Frei et al. ............................. 209/254 |
| 5,814,218 * | 9/1998 | Cagle . |
| 5,944,197 | 8/1999 | Baltzer et al. ........................ 209/400 |
| 6,000,558 | 12/1999 | Proulx et al. . |

FOREIGN PATENT DOCUMENTS

4418175 A1   12/1994   (DE) .

* cited by examiner

Primary Examiner—Thomas M. Lithgow
(74) Attorney, Agent, or Firm—Guy McClung

(57) ABSTRACT

A screen for a vibratory separator for screening fluid with material entrained therein introduced on the screen, the screen having, in certain aspects, a plurality of warp wires and a plurality of shute wires, the warp wires interwoven with the shute wires, the plurality of warp wires including a plurality of first warp wires and a plurality of spaced-apart support wires, the support wires having a diameter greater than a diameter of the warp wires. In another aspect, a screen for a vibratory separator for screening fluid with material entrained therein introduced on the screen, the screen having a plurality of warp wires and a plurality of shute wires, the warp wires interwoven with the shute wires, the plurality of shute wires including a plurality of first shute wires and a plurality of spaced-apart support wires, the support wires having a diameter greater than a diameter of the first shute wires.

12 Claims, 7 Drawing Sheets

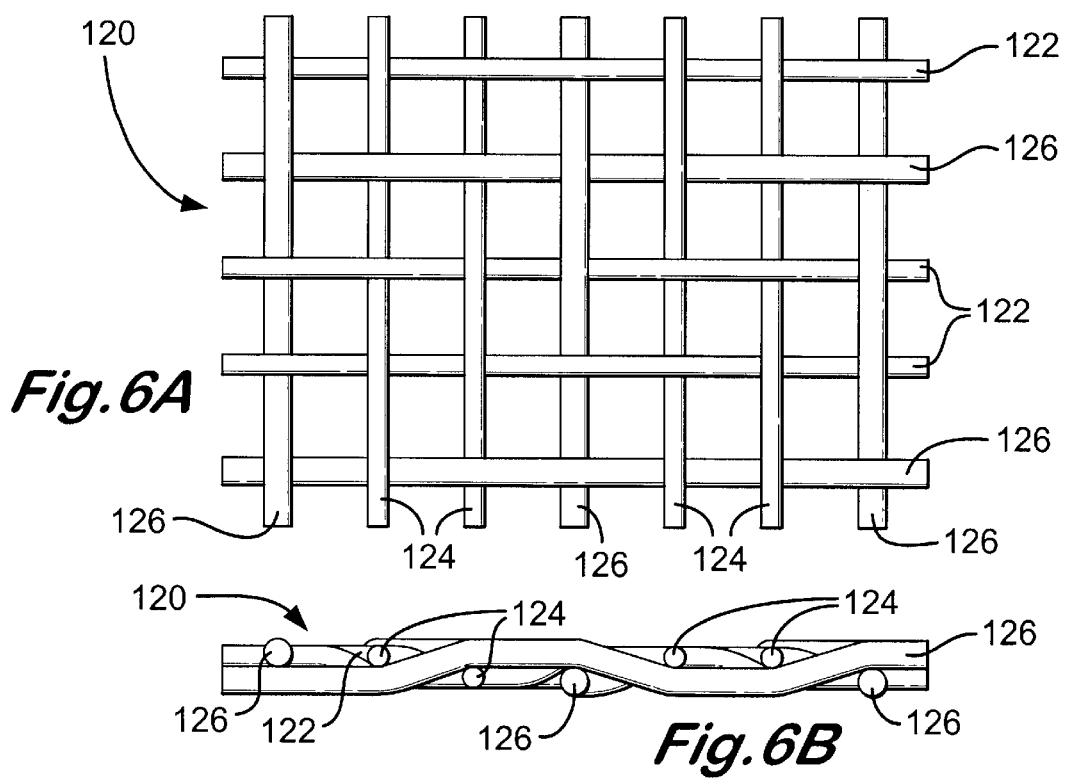
Fig.6A
Fig.6B
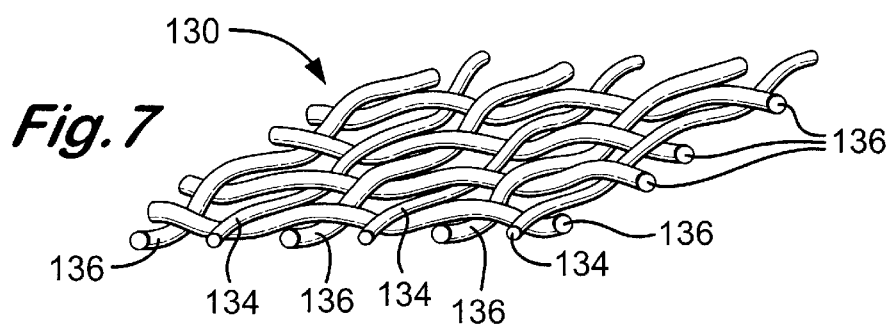
Fig.7
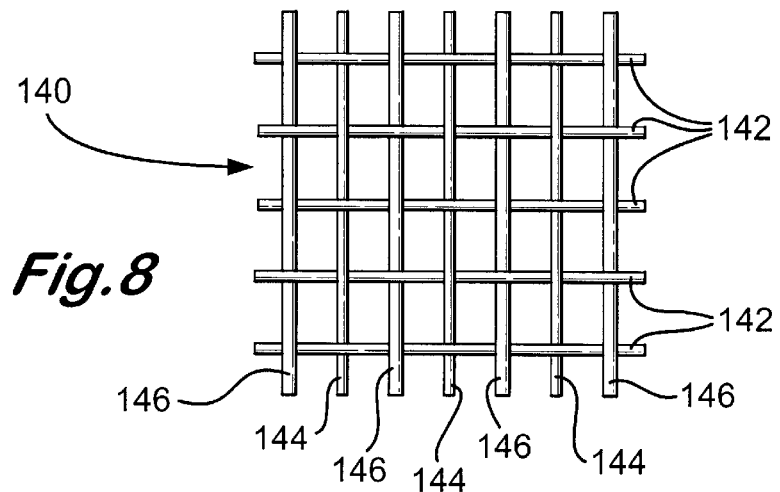
Fig.8

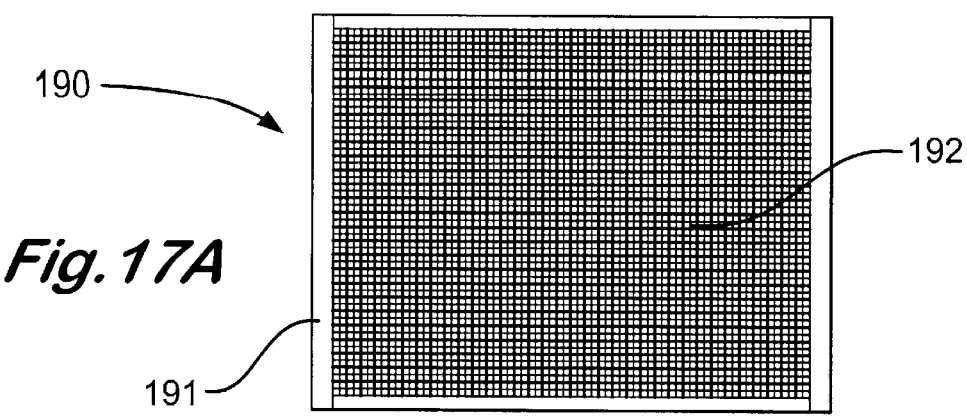
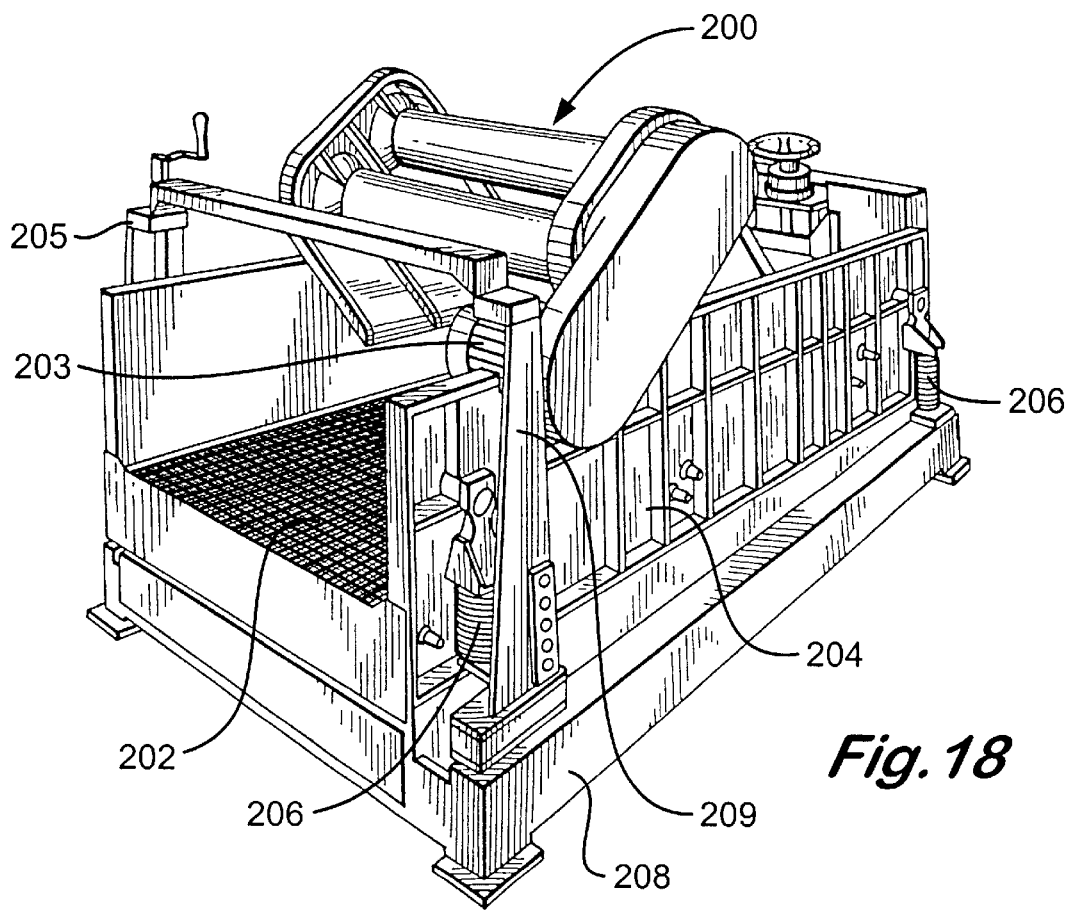

VIBRATORY SEPARATOR SCREENS

BACKGROUND OF THE INVENTION

1. Field of the Invention

This invention is directed to screening material for screens for vibratory separators, to screens made from such material, to vibratory separators with such screens, and to methods of their use.

2. Description of Related Art

Various woven cloth screens for vibratory separators are used in removing particles from a liquid and are designed to provide a tortuous path for the liquid. Many prior art woven cloths, including the typical weave, twill, dutch weave or twill dutch weave cloths have low fluid conductance characteristics due to the formation of the tortuous flow path. A minimal rate of flow results in a correspondingly slow filtering process. Often the screens need frequent cleaning to maintain a desired flow rate.

Certain prior art screens provide an open surface area and permit direct or nontortuous flow through the screen. Such screens may provide better conductance characteristics, but the fluid conductance may be limited by the permissible ratio of length to width in the interstices between the screen filaments and the fineness of the filaments. With increasing spacing between filaments, deformation of the filaments from the parallel may increase and larger than desired particles can then pass through the screen. To maintain an efficient relationship, the size of the rectangular interstices in these screens is generally minimal and the length to width ratio is generally less than three unless coarse, stiff filaments are used. Higher ratios can be achieved by bonding together the crossing filaments of the screen; but bonding can be a complex and costly process with negative side effects. By coating the filaments with a bonding material, the diameter of the filaments is increased, further reducing fluid conductance of the screen.

Particle separation, fluid throughput or conductance and screen life are important characteristics of screens for vibratory separators. Finer particle separation results in a higher percentage of impurities being removed from the screened fluid. Higher conductances are desirable because more fluid can be processed per square foot of screen area, thereby reducing costs. Doubling conductance doubles the liquid throughput. Longer screen life saves time and money. Since the mid-seventies one vibrating screen industry trend has been to decrease wire diameter in order to achieve higher conductance. For certain prior art screens this has means finer separation and higher conductance but shorter screen life. To increase screen life, the industry has tried various types of bonded screens such as plastic-backed, metal-backed or bonded-backup. These bonded screens are relatively expensive. U.S. Pat. Nos. 5,370,797; 5,256,291; and 5,256,292 disclose double shute or warp screens with a double warp plain weave screen having warp and shute wires of the same material and properties, the shute diameter at least 1.4 times the warp diameter to prevent sleaziness. If the shute diameter controls the conductance and if the shute diameter is fine enough to give very high conductance, the warp diameter is so fine that the screen has a low tensile strength and therefore shorter life; and screens for removing undesirable particles from a liquid in which a substantially flat parallel array of shute filaments are spaced at less than a preselected minimal linear dimension of undesirable particles and a parallel array of groups of warp filaments runs transverse to the shute filaments. The warp filaments of each group are oppositely woven about and between the shute filaments taken individually or in pairs to secure the shute filaments and maintain the spaces therebetween. The groups of shute filaments have spaces therebetween smaller than the preselected minimal linear dimension of the undesirable particles so that the screen is characterized by elongated rectangular flow apertures therethrough. Each group includes from 3 to 10 or more warp filaments and the shute filament diameters are as small as in the order of 1.1 times the warp filament diameter. Conductance is increased by making the rectangular apertures longer. The life of the screen is increased by increasing the number of warp wires to achieve the required tensile strength. Finer particle separation is achieved by making the short dimension of the rectangle smaller. Screens formed by this weaving of groups of three or more warp filaments transverse to shute filaments which are as small as in the order of 1.1 times the diameter of the warp filaments provide meshes having relatively higher aspect ratios with smaller filament diameters than with certain known weaves of filaments of this range of diameter.

FIGS. 1A and 1B show a prior art screen 22 as disclosed in U.S. Pat. No. 2,723,032 with a coarse mesh wire screen, or cloth 23 that provides a backing screen or cloth of the unit. A fine mesh wire screen 24 is superimposed or mounted upon the backing screen 23. The screen unit 22 has its coarse backing wire mesh or cloth coated or covered preferably with rubber or some suitable rubber or synthetic rubber composition. The strands are indicated at 25 and the covering or coating at 26. Since all of the strands 23 are coated or covered, there is, of course, rubber-to-rubber contact between these strands of the coarser mesh screen 23. The backing screen of cloth 23 is of the roller flat-top type and of any coarse size such, for example, as three of four mesh. The mesh of the finer mesh wire screen 24 varies, in accordance with the separating job to be done. For example, the mesh of the fine wire screen or cloth 24 may vary from the order of minus 20 (−20) to the order of minus 325 (−325).

FIGS. 2A and 2B disclose a screen 30 as disclosed in U.S. Pat. No. 4,696,751 with a first mesh screen with rectangular dimensions of width and length. A second screen 38 is held in superimposed abutting relationship to the first screen 32. The second 38 has width and length dimensions. The length dimensions of the first screen is larger than length dimension of the second screen, and the width dimension of the first screen is smaller than the width dimension of the second screen.

FIGS. 3A and 3B disclose screens 50 and 53 shown in U.S. Pat. No. 5,626,234 which has an upper cloth 51 and lower cloth 52. The upper cloth 51 is formed from woven stainless steel wire in the range 0.19 mm to 0.036 mm diameter and 60–325 mesh, (i.e. number of strands per inch) while the lower cloth 52 is formed from woven phosphor bronze wire in the range 0.45 mm to 0.19 mm diameter and 20–40 mesh. A screen 53 in FIG. 3B has an upper cloth 54 like the upper cloth 51 (FIG. 3A) and a lower cloth 55 woven from stainless steel wire having a nominal diameter in the range 0.20 to 0.45 mm diameter and typical 30 mesh, and is coated with an epoxy based material, or Molybdenum Disulphide, or Teflon (Registered Trade Mark), to a thickness in the range 5 to 50 microns typically 20 to 40 microns. Multiple passes of the wire through a coating process or through a succession of such processes may be necessary to achieve the desired coating thickness. The wires 57, 58, 59 are shown in cross section to show the outer material coatings 67, 68, 69 (not to scale). The wire 64 is shown with the coating scraped from one end.

There has long been a need for effective and efficient screening material for screens for vibratory separators, e.g. but not limited to, for shale shakers. There has long been a need for such screens with relatively fine diameter wires, but with desirable throughput, conductance, and non-clogging, non-blinding characteristics. There has long been a need for such screens that have sufficient support for relatively finer mesh screens and are durable in their intended uses.

SUMMARY OF THE PRESENT INVENTION

The present invention, in certain aspects, discloses a screen with wires of varying diameter in a single screen cloth layer. In one aspect, alternate wires (e.g. but not limited to, every other wire, every third wire, every fourth wire, or every fifth wire) in a screen warp direction are of a larger diameter than the other wires of the screen. In other aspects, alternate wires (e.g. but not limited to, every other wire, every third wire, every fourth wire, or every fifth wire) in a screen shute direction are of a larger diameter than the other wires of the screen. Alternatively, all wires in a warp direction or in a shute direction may be of the larger diameter.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious screening material for screens for vibratory separators;

New, useful, unique, efficient, nonobvious screens with such screening material; and New, useful, unique, efficient, nonobvious vibratory separators (e.g. shale shakers) with such screens.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a top view of a screen according to the present invention. FIG. 6B is a cross-section view of the screen of FIG. 6A.

FIG. 7 is a perspective view of a screen according to the present invention.

FIG. 8 is a top view of a screen according to the present invention.

FIG. 17A is a cross-section view of a screen according to the present invention. FIG. 17B is a side view of the screen of FIG. 17A.

FIG. 18 is a perspective view of a shale shaker with a screen according to the present invention.

DESCRIPTION OF EMBODIMENTS PREFERRED AT THE TIME OF FILING FOR THIS PATENT

Figure 4A:
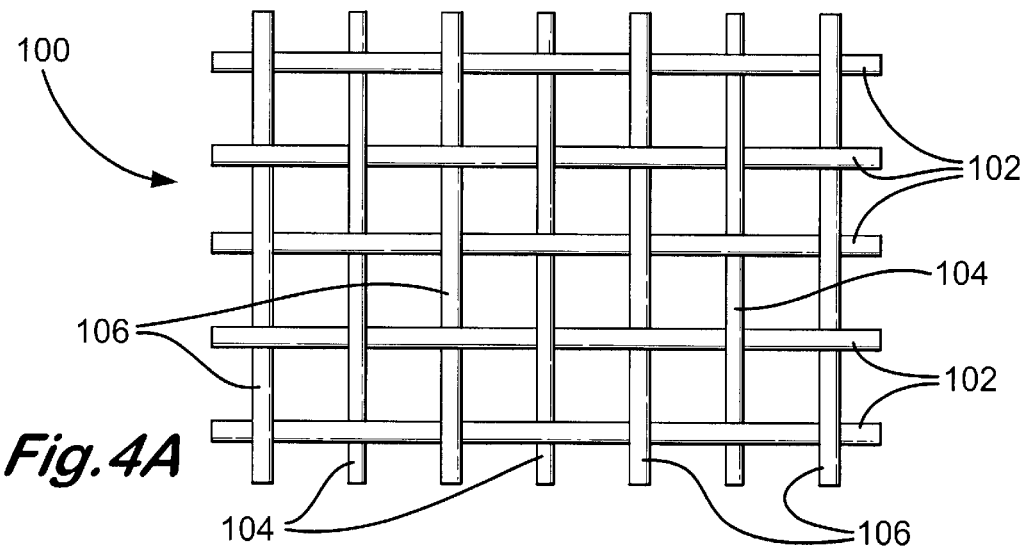
FIG. 4A is a top view of a screen according to the present invention.
Figure 4B:
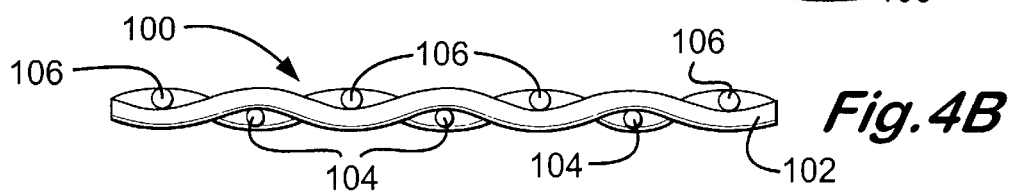
FIG. 4B is a cross-section view of the screen of FIG. 4A.

FIG. 4A shows a screen 100 according to the present invention for use in a vibratory separator, e.g., but not limited to, a shale shaker. The screen has a square mesh pattern with a plurality of wires 102 in one direction (shute direction) each of substantially the same cross-sectional diameter, e.g. ranging between about 0.0126 inches and about 0.0010 inches. The screen has a plurality of wires 104 in a direction orthogonal to that of the wires 102. The wires 104 have a cross-sectional diameter similar to that of the wires 102. Spaced-apart by the wires 104 and by space therebetween is a plurality of support wires 106 with a cross-sectional diameter larger than that of the wires 104. In certain embodiments the diameter of the wires 106 ranges between about 0.0126 inches and about 0.0010 inches. In certain aspects the diameter of the wires 106 is at least 1.15 times larger than the diameter of the wires 104.

Figure 5A:
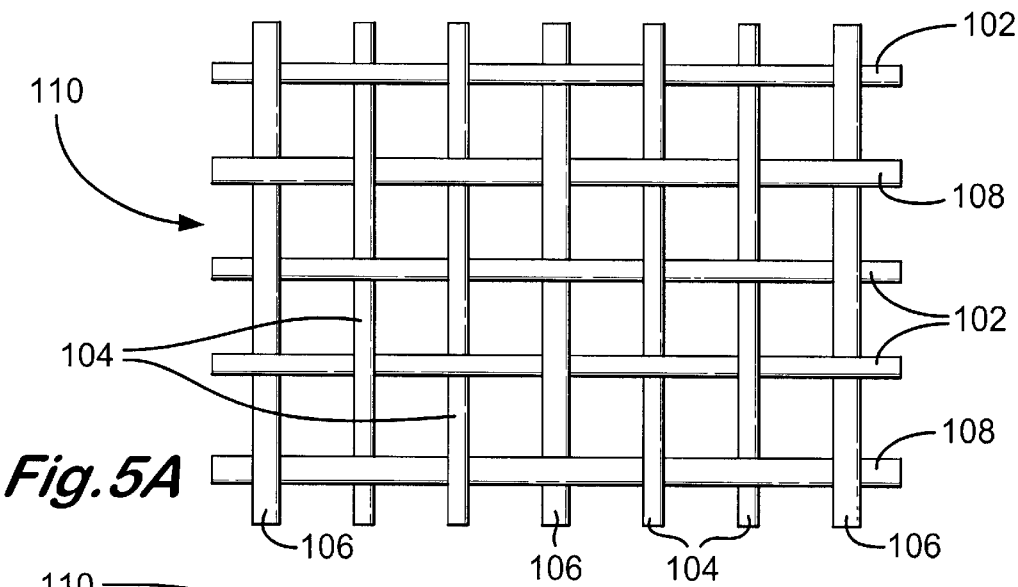
FIG. 5A is a top view of a screen according to the present invention.
Figure 5B:
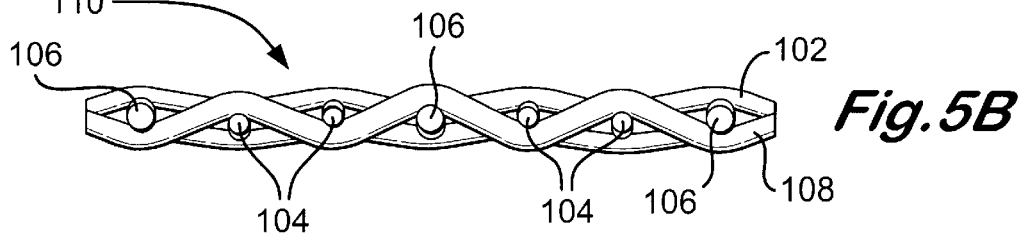
FIG. 5B is a cross-section view of the screen of FIG. 5A.
Figure 9:
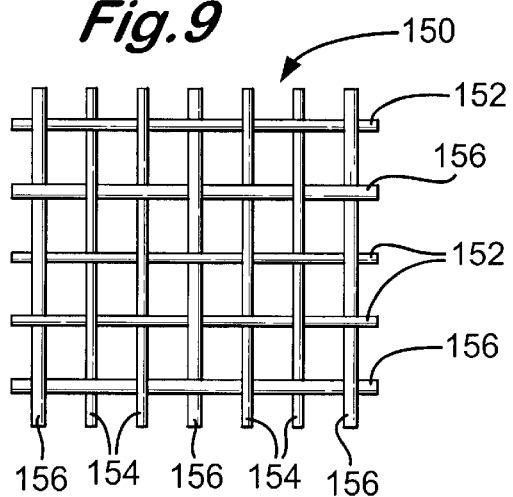
FIGS. 9–13 are top views of screens according to the present invention.
Figure 10:
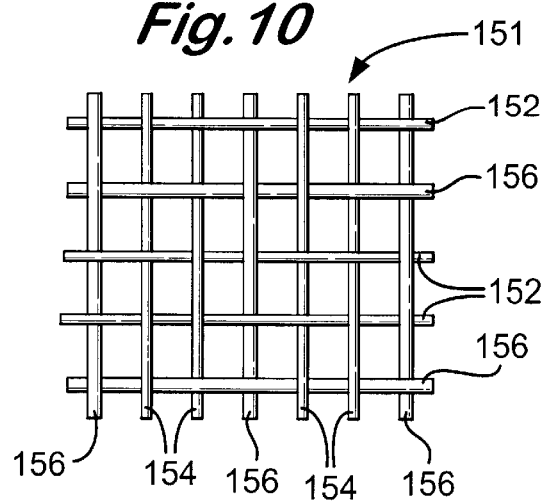
Figure 11:
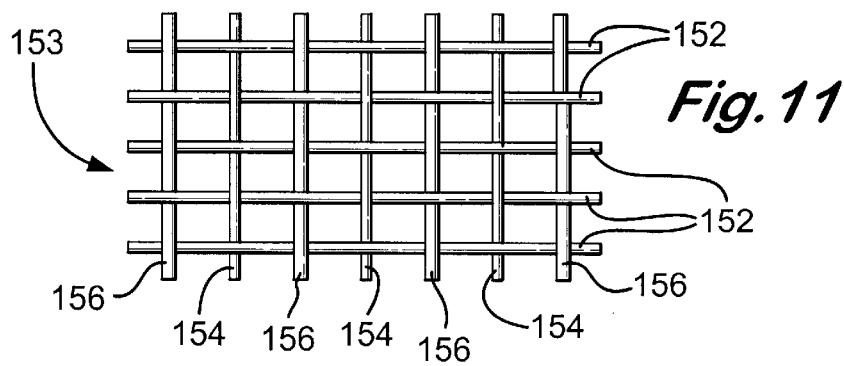
Figure 12:
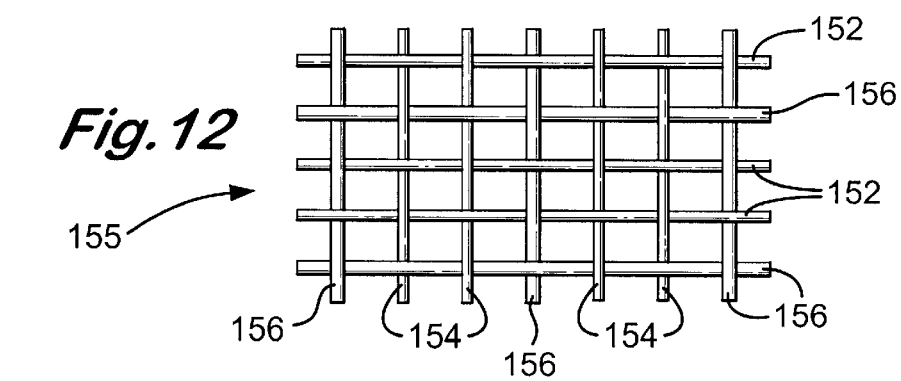
Figure 13:
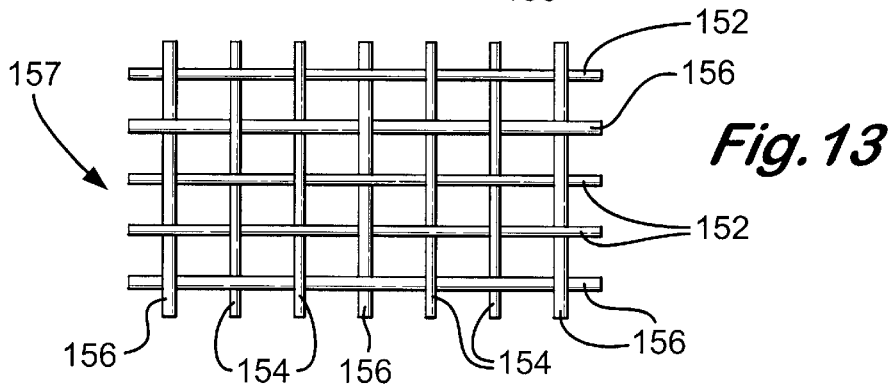

A screen 110 shown in FIGS. 5A and 5B is like the screen 100, but the larger diameter wires 106 are every third wire in the warp direction, rather than every other wire as in the screen 100. Also every third wire 108 in the shute direction is a larger diameter wire like the wires 106. The same numerals in FIGS. 4A and 5A indicate the same parts.

FIG. 6A shows a screen 120 according to the present invention with a twill mesh pattern with every third wire 126 (like the wires 106, FIG. 4A) in both directions of a larger diameter than the remaining wires 122 and 124 (like the wires 102, 104 respectively, FIG. 4A).

FIG. 7 shows a screen 130 with all larger diameter wires 136 (like the wires 106, FIG. 4A) in the shute direction and every other wire in the warp direction of larger diameter. Every other wire 134 in the warp direction is a smaller diameter wire (like the wires 102, 104, FIG. 4A).

FIG. 8 shows a screen 140 according to the present invention with a rectangular mesh pattern with every other wire in the warp direction a larger diameter wire 146 (like the wires 106, FIG. 4A) and smaller diameter wires 142 and 144 (like the wires 102, 104 respectively, FIG. 4A).

FIGS. 9–13 show screens 150, 151, 153, 155, and 157 respectively, each with a rectangular mesh pattern, with larger diameter wires 156 (like the wires 106, FIG. 4A) and smaller diameter wires 152, 154 (like the wires 102, 104 respectively, FIG. 4A).

Figure 1A:
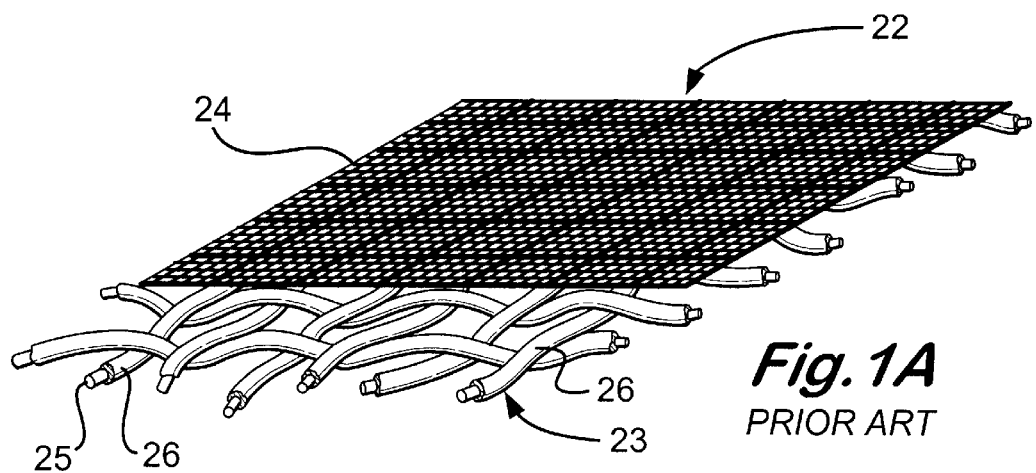
FIG. 1A is a perspective view of a prior art screen.
Figure 1B:
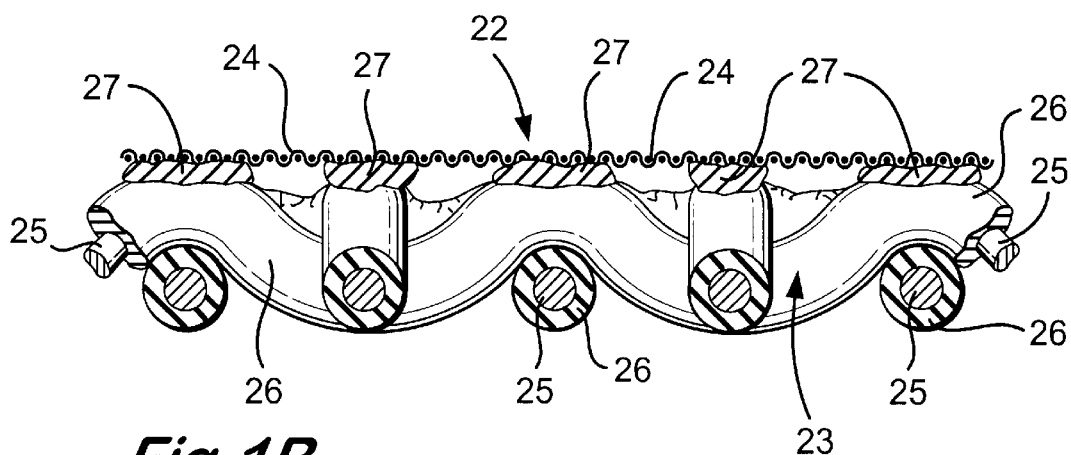
FIG. 1B is a cross-section view of the screen of FIG. 1A.
Figure 14:
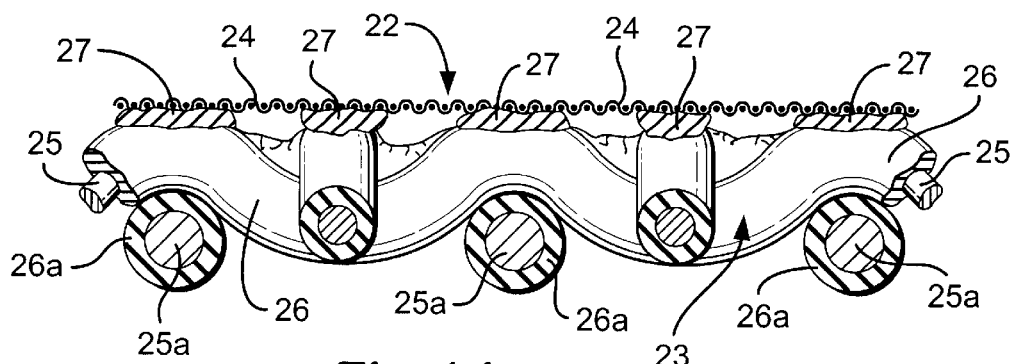
FIG. 14 is a cross-section view of a screen according to the present invention.

FIG. 14 shows a screen 160 according to the present invention like the screen of U.S. Pat. No. 2,723,032, but with alternating larger diameter wires 25a instead of the wires 25 as shown in FIGS. 1A–1B. The coating 26a is larger than the coating 26 shown in FIG. 1B. It is also within the scope of this invention for the upper screen layer of the screen 22 to be of any screen material according to the present invention.

Figure 2A:
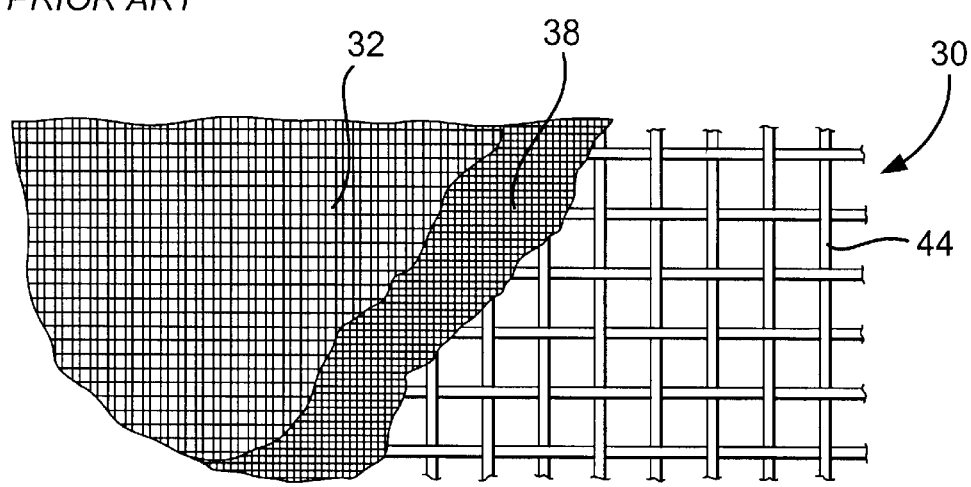
FIG. 2A is a top view, partially cut away of a prior art screen.
Figure 2B:
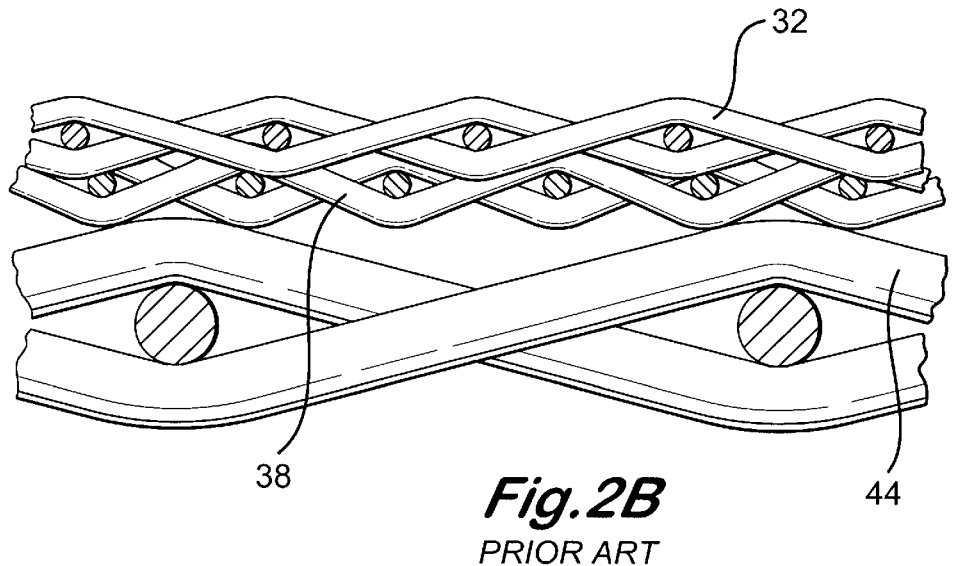
FIG. 2B is a cross-section view of the screen of FIG. 2A.
Figure 15:
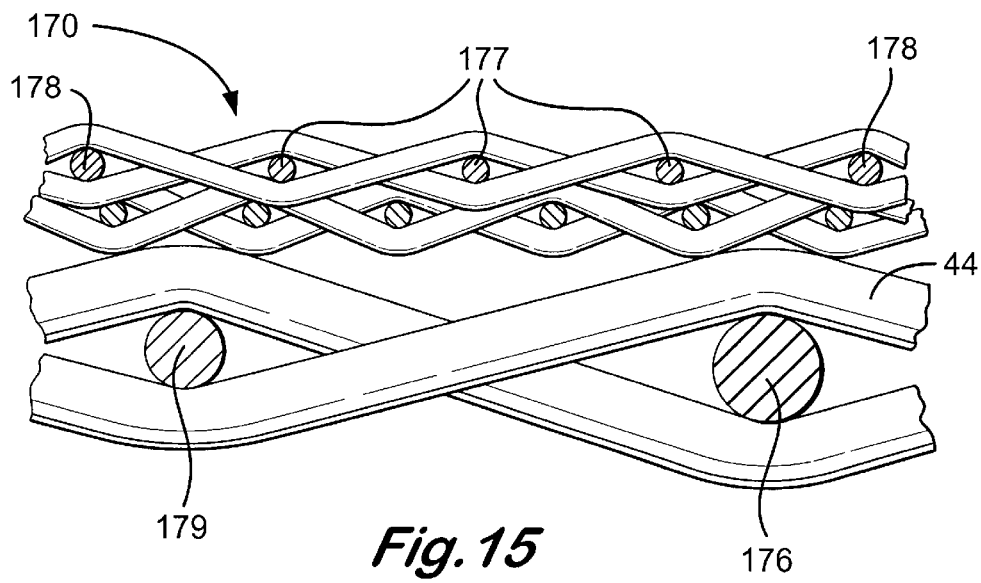
FIG. 15 is a cross-section view of a screen according to the present invention.

FIG. 15 shows a screen 170 according to the present invention like the screen of U.S. Pat. No. 4,696,751 (incorporated fully herein for all purposes) (FIGS. 2A and 2B), but with larger diameter wires 176 (every other wire) between the wires 179 [in the layer 44 (FIGS. 2A, 2B)] and with every fourth wires 178 in the top layer of screen material larger in cross-sectional diameter than the remaining wires 177 in that layer. The wires 176 may be eliminated; the layer 44 may be eliminated; and/or the wires 178 may be eliminated—all according to the present invention. It is also within the scope of the present invention to use any screening material disclosed herein for any of the fine screening layers of the screen 170.

Figure 3A:
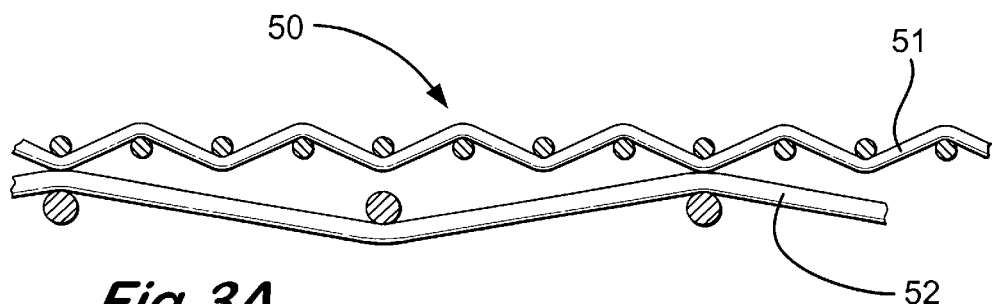
FIG. 3A is a cross-section view of a prior art screen.
Figure 3B:
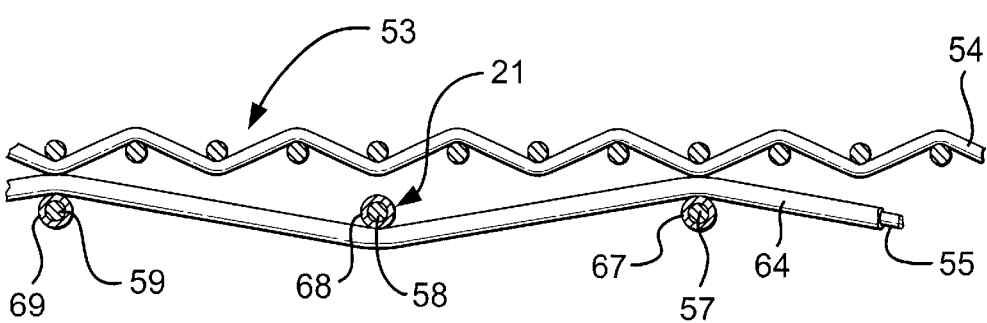
FIG. 3B is a cross-section view of a prior art screen.
Figure 16:
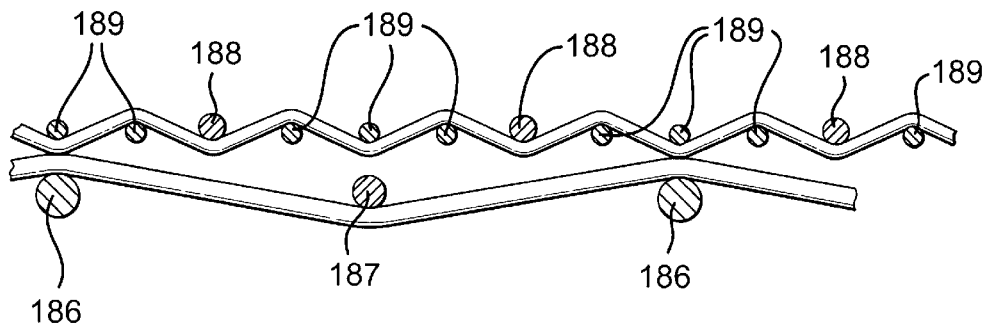
FIG. 16 is a cross-section view of a screen according to the present invention.

FIG. 16 shows a screen 180, like the screen of U.S. Pat. No. 5,626,234 (incorporated fully herein for all purposes) shown in FIG. 3A, but with larger diameter wires 186 in the lower screening layer between smaller diameter wires 187 and larger diameter wires 188 in the upper screening layer between smaller diameter wires 189. Either plurality of larger diameter wires may be eliminated and the lower layer of screening material may be eliminated.

FIGS. 17A and 17B show a screen 190 according to the present invention with an optional outer frame 191 (like any frame disclosed in the prior art) with screening material 192 mounted thereto (like any screening material according to the present invention disclosed herein). Item 193 shown schematically in FIG. 17B indicates any known lower supporting apertured plate, perforated plate, series of straps or strips, strip member or coarse supporting mesh, which is optional for the screen 190. It is within the scope of this invention to have additional layers of screening material (one, two or more) according to the present invention above or below the layer of screening material 192. Any screen 190 with two or more layers of screening material may have the layers interconnected, bonded to each other, and/or sintered together in any known manner. Any known hookstrip (e.g. angled, L-shaped, C-shaped, etc.) may be used with the screen 190 and with any screen according to the present invention.

FIG. 18 shows a vibratory separator system 200 according to the present invention that has a screen 202 (like any screen disclosed herein) according to the present invention mounted on vibratable screen mounting apparatus or "basket" 204. The screen 202 may be any screen disclosed herein or have any combination of any feature or features of any screen or screen part disclosed herein; and any such screen may be used with any appropriate shaker or screening apparatus. The basket 204 is mounted on springs 206 (only two shown; two as shown are on the opposite side) which are supported from a frame 208. The basket 204 is vibrated by a motor 203 and interconnected vibrating apparatus 209 which is mounted on the basket 204 for vibrating the basket and the screens. Elevator apparatus 205 provides for raising and lowering of the basket end.

The present invention, therefore, in certain (and not necessarily all) embodiments, provides a screen for a vibratory separator (e.g. but not limited to a shale shaker) for screening fluid with material entrained therein introduced on the screen, the screen having a plurality of warp wires, a plurality of shute wires, the warp wires interwoven with the shute wires, the plurality of warp wires including a plurality of first warp wires and a plurality of spaced-apart support wires, the support wires having a diameter greater than a diameter of the warp wires. Such a screen may have one, or some (in any possible combination) of the following: wherein the diameter of the support wires is at least 1.15 times greater than the diameter of the first warp wires; wherein the diameter of the support wires ranges between 0.0126 inches and 0.0010 inches; wherein every other wire in the warp direction is a support wire; wherein every third wire in the warp direction is a support wire; wherein the wires are woven together in a square mesh pattern; wherein the wires are woven together in a twill mesh pattern; a lower support below the screen; and/or an outer frame around and to which is connected the screen.

The present invention, therefore, in certain (and not necessarily all) embodiments, provides a screen for a vibratory separator for screening fluid with material entrained therein introduced on the screen, the screen having a plurality of warp wires, a plurality of shute wires, the warp wires interwoven with the shute wires, the plurality of shute wires including a plurality of first shute wires and a plurality of spaced-apart support wires, the support wires having a diameter greater than a diameter of the first shute wires. Such a screen may have one, or some (in any possible combination) of the following: wherein the diameter of the support wires is at least 1.15 times greater than the diameter of the first shute wires; wherein the diameter of the support wires ranges between 0.0126 inches and 0.0010 inches; wherein every other wire in the shute direction is a support wire; wherein every third wire in the shute direction is a support wire; wherein the wires are woven together in a square mesh pattern; wherein the wires are woven together in a twill mesh pattern; a lower support below the screen; an outer frame around and to which is connected the screen; and/or wherein the warp wires and shute wires are made from material from the group consisting of metal, steel, stainless steel, copper, bronze, brass, aluminum, aluminum alloy, zinc, zinc alloy, platinum, titanium, plastic, fiberglass, and polytetrafluoroethylene.

For any screen according to the present invention the warp wires and/or shute wires and/or support wires may be made from material from the group consisting of metal, steel, stainless steel, copper, bronze, brass, aluminum, aluminum alloy, zinc, zinc alloy, platinum, titanium, plastic, fiberglass, and polytetrafluoroethylene.

The present invention, therefore, in certain (and not necessarily all) embodiments, provides a vibratory separator system for treating fluid introduced thereto, the fluid having material entrained therein, the system having a vibratory separator, at least one screen on the vibratory separator for screening material from the fluid, the at least one screen a screen according to the present invention.

The present invention, therefore, in certain (and not necessarily all) embodiments, provides a plurality of at least two screens, one on top of the other, each of the at least two screens a screen according to the present invention. Any, some or all of such at least two screens may be connected together, glued together, sintered together and/or bonded together.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A plurality of at least two screens, one on top of the other, said plurality comprising at least a first screen and a second screen, the first screen comprising a plurality of first warp wires and a plurality of first shute wires, the first warp wires interwoven with the first shute wires, and a plurality of spaced-apart first support wires interwoven with the first shute wires, the first support wires having a diameter greater than a diameter of the first warp wires, the second screen comprising a plurality of second warp wires and a plurality of second shute wires, the second warp wires interwoven with the second shute wires, and a plurality of second spaced-apart support wires interwoven with the second shute wires, the second support wires having a diameter greater than a diameter of the second warp wires, and the first support wires having a diameter less than the diameter of the second support wires.

2. The plurality of at least two screens of claim 1 wherein the at least two screens are bonded together.

3. The plurality of at least two screens of claim 1 wherein the diameter of the first support wires is at least 1.15 times greater than the diameter of the first warp wires.

4. The plurality of at least two screens of claim 1 wherein in the first screen every other wire in the warp direction is a first support wire.

5. The plurality of at least two screens of claim 1 wherein in the first screen every third wire in the warp direction is a first support wire.

6. The plurality of at least two screens of claim 1 further comprising a lower support below the plurality of at least two screens.

7. The plurality of at least two screens of claim 1 with frame to which is connected the plurality of at least two screens.

8. The plurality of at least two screens of claim 1 wherein the diameter of the second support wires is at least 1.15 times greater than the diameter of the second warp wires.

9. The plurality of at least two screens of claim 1 wherein in the second screen every other wire in the shute direction is a second support wire.

10. The plurality of at least two screens of claim 1 wherein in the second screen every third wire in the shute direction is a second support wire.

11. The plurality of at least two screens of claim 1 wherein the wires are made from material from the group consisting of metal, steel, stainless steel, copper, bronze, brass, aluminum, aluminum alloy, zinc, zinc alloy, platinum, titanium, plastic, fiberglass, and polytetrafluoroethylene.

12. A vibratory separator system for treating fluid introduced thereto, the fluid having material entrained therein, the system comprising a vibratory separator, a plurality of at least two screens on the vibratory separator for screening material from the fluid, the plurality of at least two screens comprising at least a first screen and a second screen, the first screen comprising a plurality of first warp wires and a plurality of first shute wires, the first warp wires interwoven with the first shute wires, and a plurality of spaced-apart first support wires interwoven with the first shute wires, the first support wires having a diameter greater than a diameter of the first warp wires, the second screen comprising a plurality of second warp wires and a plurality of second shute wires, the second warp wires interwoven with the second shute wires, and a plurality of second spaced-apart support wires interwoven with the second shute wires, the second support wires having a diameter greater than a diameter of the second warp wires, and the first support wires having a diameter less than the diameter of the second support wires.

* * * * *